United States Patent [19]

Ramquist

[11] 4,367,806
[45] Jan. 11, 1983

[54] COMBINED DRIVE AND BRAKE MECHANISM FOR A WHEELED VEHICLE CARRIAGE

[76] Inventor: Amos H. Ramquist, 13722 NE. 70th Pl., Redmond, Wash. 98052

[21] Appl. No.: 195,316

[22] Filed: Oct. 8, 1980

[51] Int. Cl.³ ............................................. B60K 17/14
[52] U.S. Cl. ...................................... 180/308; 60/460
[58] Field of Search .................. 180/308, 305; 60/460, 60/464, 466

[56] References Cited

U.S. PATENT DOCUMENTS 1,008,202 11/1911 Schmucker ...................... 180/308 X
2,599,450 6/1952 Henning ................................ 60/466

OTHER PUBLICATIONS

Sperry Vickers "Industrial Hydraulics Manual" 1st Edition, 1970, Publishers: Sperry Rand Corp., Tory, Michigan 48084; pp. 9-11, 9-12, 9-13.

*Primary Examiner*—John A. Pekar
*Attorney, Agent, or Firm*—Christopher Duffy

[57] ABSTRACT

The mechanism comprises a hydraulic circuit having a power driven pump; a reservoir for hydraulic fluid, and a motor for each wheel or two or more coaxial wheels of the carriage. The motor has a movable driven member therein and ports for the infeed and outfeed of fluid therethrough. There are connecting means between the pump, the reservoir and the ports whereby the fluid can be circulated through the motor to drive the driven member thereof. There is also a connection between the driven member of the motor and the corresponding wheel or wheels whereby the motion of one is directly transmitted to the other and vice versa, depending on which is being driven at faster speed. In addition, there are means in the hydraulic circuit for varying the speed of the driven member, and means whereby the vehicle operator can control the speed varying means to adjust the rotational speed of the respective wheel or wheels of the carriage in relation to the speed of the vehicle.

15 Claims, 6 Drawing Figures

COMBINED DRIVE AND BRAKE MECHANISM FOR A WHEELED VEHICLE CARRIAGE

THE INVENTION IN GENERAL

This invention relates to a combined drive and brake mechanism for a wheeled vehicle carriage having one or more wheels. The wheel or wheels may engage the ground or the like, as in the case of a wheeled chassis, or they may not engage the ground or the like, as in the case of a tracked vehicle. Moreover, even where the wheel or wheels do engage the ground or the like in use, the drive action and/or brake action of the mechanism may be partially or indirectly applied to the same at some other point in time. For example, in the case of the landing carriage of an aircraft, the drive action may be preapplied to the wheels of the same, to "spin-up" the wheels before they engage the ground during the landing of the aircraft. Other examples will also become apparent as the invention is explained hereinafter.

The inventive mechanism comprises a hydraulic circuit having a power driven pump, a reservoir for hydraulic fluid, and a motor for each wheel or two or more coaxial wheels of the carriage. The motor has a movable driven member therein and ports for the infeed and outfeed of fluid therethrough. There are connecting means between the pump, the reservoir and the ports whereby the fluid can be circulated through the motor to drive the driven member thereof. There is also a connection between the driven member of the motor and the corresponding wheel or wheels whereby the motion of one is directly transmitted to the other and vice versa, depending on which is being driven at faster speed. In addition, there are means in the hydraulic circuit for varying the speed of the driven member, and means whereby the vehicle operator can control the speed varying means to adjust the rotational speed of the respective wheel or wheels of the carriage in relation to the speed of the vehicle.

In certain of the presently preferred embodiments of the invention, the speed varying means include valve means which are operable to vary the rate at which the fluid is circulated through the motor relative to the rotational speed of the corresponding wheel or wheels. Moreover, in many of these embodiments, the connecting means include a return connection between the motor outfeed port and the reservoir, and the valve means are disposed in the return connection. In fact, in some of them, the valve means have a throttling capability and the control means include a servomechanism whereby the operator can throttle the valve means to vary the rate at which the fluid is discharged through the outfeed port of the motor.

In certain of the presently preferred embodiments, moreover, the connecting means include means whereby the hydraulic circuit can be programmed to assume (1) a mode of operation in which the pump output is fed to the motor to drive the driven member thereof at the relatively faster speed, or (2) a mode of operation in which the motor is connected to the reservoir in suction and the pump output is bypassed to the reservoir independent of the motor. In such a case, the control means commonly include means whereby the vehicle operator can cause the circuit programming means to program the circuit to assume the first mentioned mode of operation, and means responsive to a predetermined pressure in the pump output to cause the circuit programming means to program the circuit to assume the second mentioned mode of operation. Preferably, the control means also include means operable to cause the circuit programming means to program the circuit to assume the second mentioned mode of operation when the wheel or wheels are at a standstill. This last named means may be operator actuated, or it may be responsive to the standstill condition of the wheel or wheels.

In many of the presently preferred embodiments, the circuit programming means include a positive feed connection between the reservoir and the motor infeed port through the pump, a suction feed connection between the reservoir and the motor infeed port, a bypass connection between the positive feed connection and the reservoir, and second valve means in the respective connections whereby (1) the bypass connection can be closed and the pump output can be fed to the motor infeed port through the positive feed connection, or (2) the bypass connection can be opened and the motor infeed port can be connected to the reservoir through the suction feed connection. The control means in these latter embodiments include servocontrol means whereby the operator can signal the second valve means to assume the first mentioned mode of operation, means for sensing the pressure in the positive feed connection, and second servocontrol means interconnected with the pressure sensing means and responsive to the predetermined pressure in the positive feed connection to override the operator initiated signal in the first mentioned servocontrol means to cause the second valve means to assume the second mentioned mode of operation. Preferably, they also include third servocontrol means which are responsive to the wheel or wheels being at a standstill to cause the second valve means to assume the second mentioned mode of operation.

In some of the foregoing embodiments, the driven member of the motor is capable of moving in forward and reverse directions, and the mechanism further comprises means for circulating the fluid through the motor in either the forward or reverse direction when the circuit is programmed to assume the respective first and second mentioned modes of operation. For example, in certain of the foregoing embodiments, each of the aforementioned feed connections and the return connection is bifurcated to be interconnected with alternative pairs of ports in the motor, and the circuit programming means also include third valve means whereby each of the respective feed connections can be interconnected with the respective pairs of ports through alternative bifurcations. Moreover, the control means include fourth servocontrol means whereby the operator can signal the third valve means to interconnect the respective feed connections through the respective bifurcations corresponding to the respective forward and reverse directions during the respective modes of operation.

In many of the latter group of embodiments, the first mentioned valve means include shutoff valves in the bifurcations of the return connection, and the second mentioned valve means include a shutoff valve in the bypass connection, and two-way valves in the respective feed connections upstream of the respective bifurcations therein, there being a cross-connection between the two-way valves in the respective feed connections whereby they can also serve as the third valve means. The respective valves are solenoid or otherwise electrically operated, and the respective first, second, third and fourth mentioned servocontrol means take the form of an integrated control unit which is electrically interconnected with the pressure sensing means and the respective shutoff valves and two-way valves (1) to close the shutoff valves in the return connection, open the shutoff valve in the bypass connection, and position the two-way valves to open the positive feed connection to the bifurcation corresponding to the desired direction of movement when the wheel or wheels are at a standstill (2) to close the shutoff valve in the bypass connection and open the shutoff valve in the bifurcation of the return connection corresponding to the desired direction of movement when the operator initiates the signal to drive the driven member at the relatively faster speed, and (3) to reopen the shutoff valve in the bypass connection and adjust the position of one or more of the two-way valves in the feed connections to interconnect the motor with the reservoir through the appropriate bifurcation of the suction feed connection when the predetermined pressure is attained in the positive feed connection.

The driven member of the motor is preferably a rotary member, such as the symmetrically angularly grooved, vane-equipped rotor of a sliding vane type of hydraulic motor. Also, the rotor is preferably mounted on the wheel or wheels to rotate about the rotational axis thereof, such as on the central hub of the wheel to be journalled about the axle of the same.

BRIEF DESCRIPTION OF THE DRAWINGS

These features will be better understood by reference to the accompanying drawings which illustrate one of the presently preferred embodiments of the invention wherein the mechanism is employed to drive and brake a four wheeled vehicle chassis.

In the drawings.

DESCRIPTION OF THE PREFERRED EMBODIMENT

Figure 1:
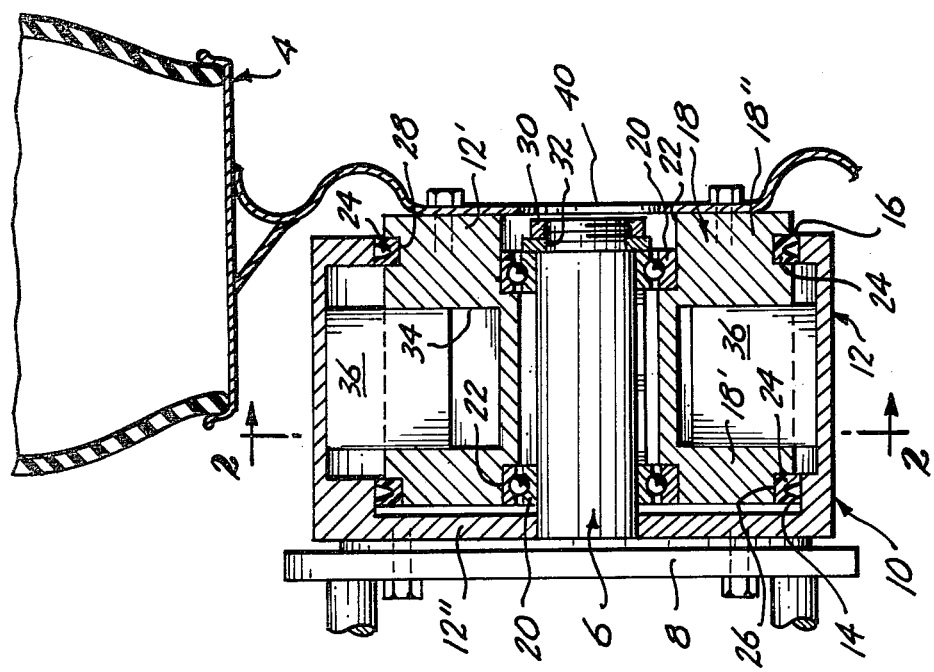
FIG. 1 is a part cross-sectional view of one wheel of the chassis and the corresponding motor thereof.
Figure 2:
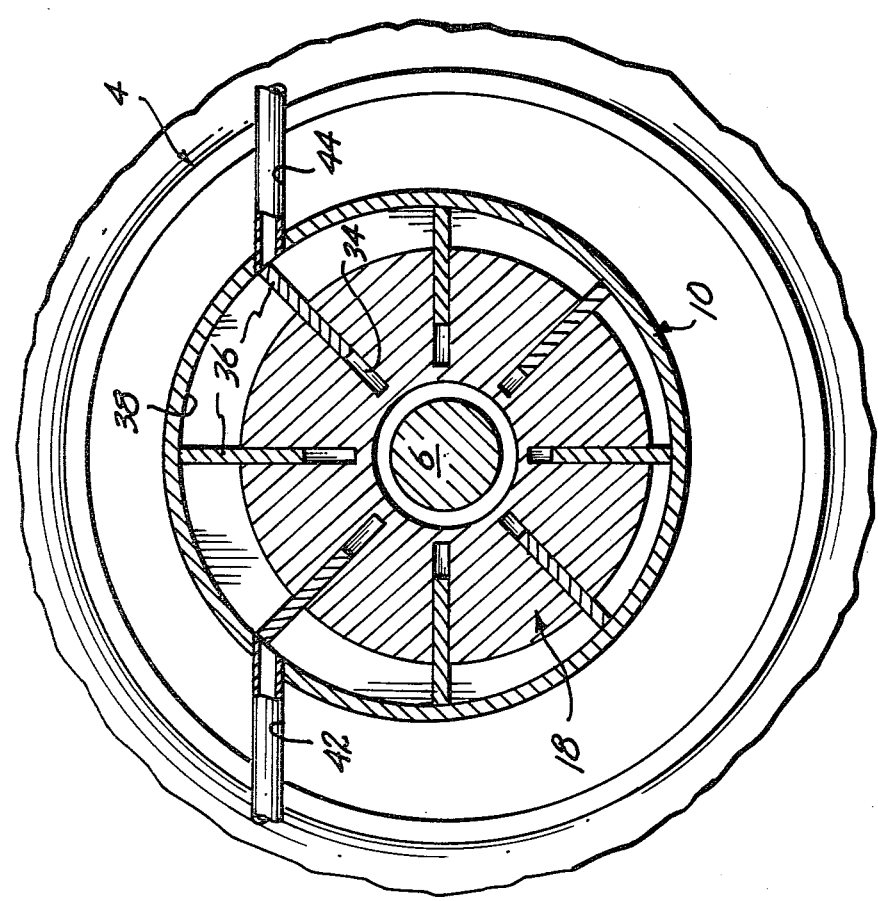
FIG. 2 is a part cross-sectional view along the line 2—2 of FIG. 1.

On the left hand side of FIGS. 3-6, there is a schematic representation 2 of the four wheeled vehicle chassis. It might be that of a conventional car or truck, and in such a chassis, the ground engaging wheels 4 would be commonly arranged in tandem pairs on corresponding pairs of axles 6. However, for simplicity, only one wheel 4 and the axle 6 thereof are shown in FIGS. 1 and 2. Nevertheless, as shown by that wheel, the axles in each pair of wheels are supported on a pair of oppositely disposed discs 8, and each disc has a sliding vane type of rotary motor 10 mounted thereon as a rotary hub for the respective wheel. The motor comprises a cylindrical housing 12 which is open ended at its relatively outer end 12', and interiorly rabbetted at its relatively inner end 12". The cylindrical axis of the housing 12 is eccentric to that of the axle 6, as are those of the rabbet 14 and the end opening 16 of the housing; and rotatably seated in the rabbet 14 and the end opening 16 is a symmetrically angularly grooved rotor 18. The rotor is interiorly end rabbetted and journalled on the axle 6 together with a pair of roller bearings 20 which are seated between the two in the end rabbets 22 of the rotor. Moreover, at its exterior, the relatively inner and outer end portions 18' and 18" of the rotor are rabbetted and circumferentially grooved, respectively, and a pair of rotary seals 24 are interengaged between the rabbett 26 and groove 28 of the rotor, and the inner rabbet 14 and end opening 16 of the housing. The rotor 18 and bearings 20 are threadedly retained on the axle by a nut 30 and washer 32, and the angularly oriented grooves 34 in the rotor are equpped with a set of vanes 36. The vanes are slidably engaged in the respective grooves 34, and are yieldably radially outwardly biased to remain in slidable engagement with the inner wall 38 of the housing as the rotor rotates about the axle.

Each rotor 18 has the hub 40 of the corresponding wheel 4 bolted to the outer end 18" thereof, so that the rotation of one is directly transmitted to the other and vice versa, depending on which is being driven at the faster speed, as shall be explained. Moreover, each motor 10 has relatively tangentially opposing ports 42 and 44 in the inner wall 38 thereof, and the ports are interconnected with a hydraulic circuit 46 (FIGS. 3-6) which is part of a mechanism 48 adapted to drive the respective rotors at the relatively faster speed when desired, or to brake the rotors when desired, so that the wheels take on the relatively faster speed and thus are braked in turn. The circuit 46 includes a pair of manifolds 50 and 52 for the respective ports 42 and 44 of the four motors. It also includes an engine driven pump 54, a reservoir 56 for hydraulic fluid, preferably at atmosphere, and supply and return connections 58 and 60, respectively, between the pump, the reservoir and the manifolds 50 and 52 whereby the fluid can be circulated through the respective motors to achieve the foregoing drive and brake conditions. The supply connection 58 is bifurcated into two individually bifurcated passages. One comprises a series of hydraulic feed lines 62, 64, 66, 68 and 70 which serve as a bifurcated positive feed connection 71 between the reservoir 56 and the manifolds 50, 52 through the pump. The other comprises a series of lines 72, 68 and 66, 70 which serve as a bifurcated suction feed connection 73 between the reservoir and the manifolds. In addition, the supply connection 58 also includes a line 74 which serves as a bypass connection between the line 62, 64 of the positive feed connection 71 and the reservoir 56. The return connection 60 comprises a single bifurcated passage which includes a pair of lines 76 and 78 that are interconnected with the manifolds 42 and 44, respectively, downstream thereof. Due to the bifurcation, both the supply connection 58 and the return connection 60 can be interconnected with alternative pairs of ports 42 and 44, to enable the flow through the motors 10 to be reversed for purposes of reversing the rotational direction of the rotors 18 and thus the rotational direction of the wheels 4.

The change in direction, and the basic drive and brake modes of the mechanism 48, are all controlled by a system of solenoid or otherwise electrically operated valves 80, 82, 84, 86 and 88 in the circuit 46, two of which 86 and 88, are also under the control of a pressure responsive servomechanism 90 which is actuated through a brake pedal (not shown) that is available to the operator in the vehicle cab (not shown). The electrical signals for the valves are provided by a master control unit 92, which in turn is under the control of the vehicle operator and/or a pressure sensor 94 in the line 62 of the positive feed connection 71.

The valves 80 and 82 are disposed in the supply connection 58 and are two-way valves. One of them, 80, is disposed in the positive feed connection 71 at the juncture of the lines 66, 68 and 70 with line 64; and the other, 82, is disposed in the suction feed connection 73 at the juncture of the lines 66, 70 and 68 with line 72. The valve 84 is disposed in the bypass connection 74 and is a normally open shutoff valve. The valves 86 and 88 are disposed in the lines 76 and 78, respectively, of the return connection 60 and are normally closed shutoff valves. However, each of these latter shutoff valves also has a variable flow or throttling capability when it is open, as shall be explained.

The control unit 92 is programmed by a microprocessor (not shown) to close and open the valves 84, 86 and 88 on signal from the vehicle operator, and to change the direction of the valves 80 and 82 on signal from the operator. Moreover, these functions are normally integrated into several operational combinations, each of which can be initiated by a different signal from the operator. However, the control unit is also programmed to monitor the pressure in the line 62 through the sensor 94, and to override the operator initiated signal when the pressure in the positive feed connection 71 rises above a predetermined pressure, as shall be explained.

The required electrical connections between the control unit and the respective valves 80 through 88, can be seen at 96, 98, 100, 102 and 104. The connection to the sensor 94 can be seen at 106. The various signals bundle through a common connection 108.

Figure 3:
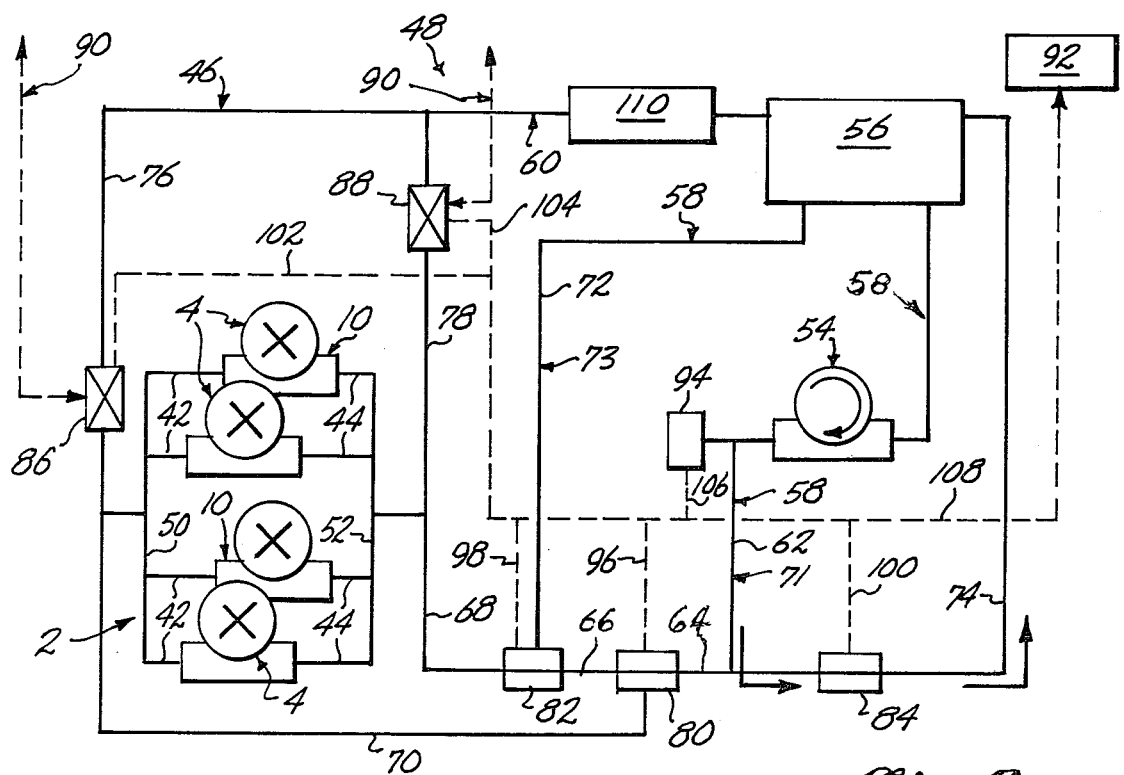
FIG. 3 is a schematic representation of the mechanism when the vehicle is at a standstill.
Figure 4:
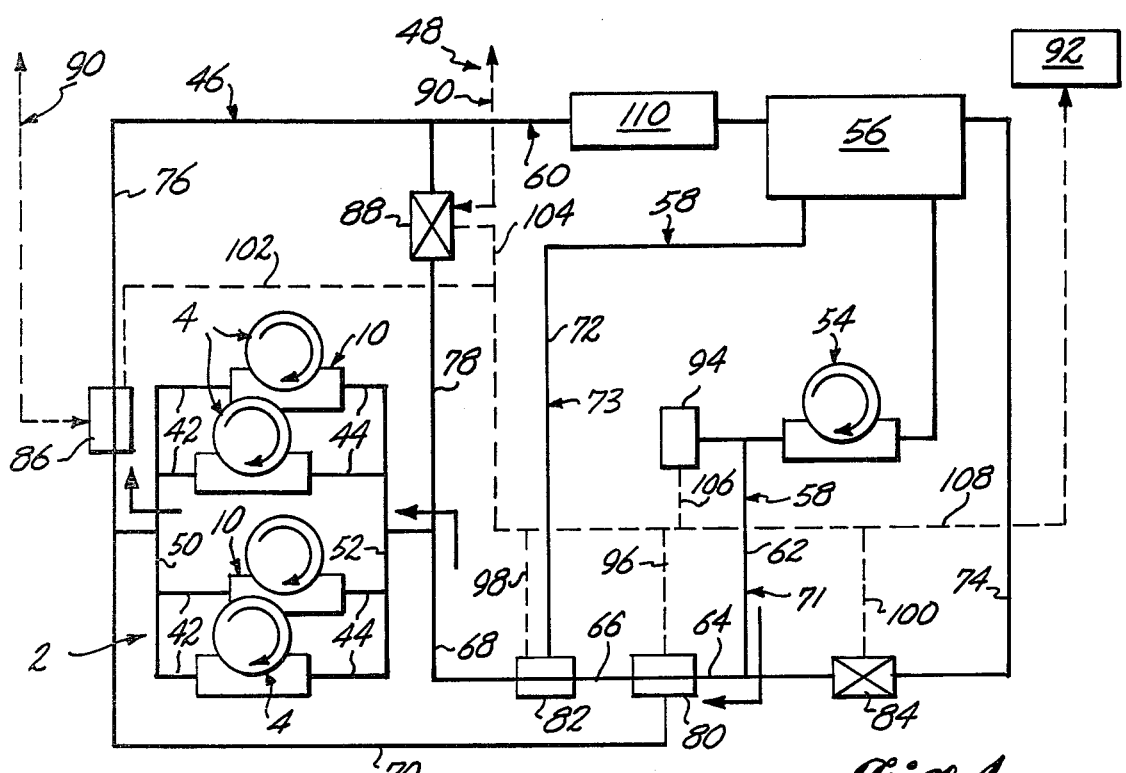
FIG. 4 is a similar representation when the vehicle is being driven forward.
Figure 5:
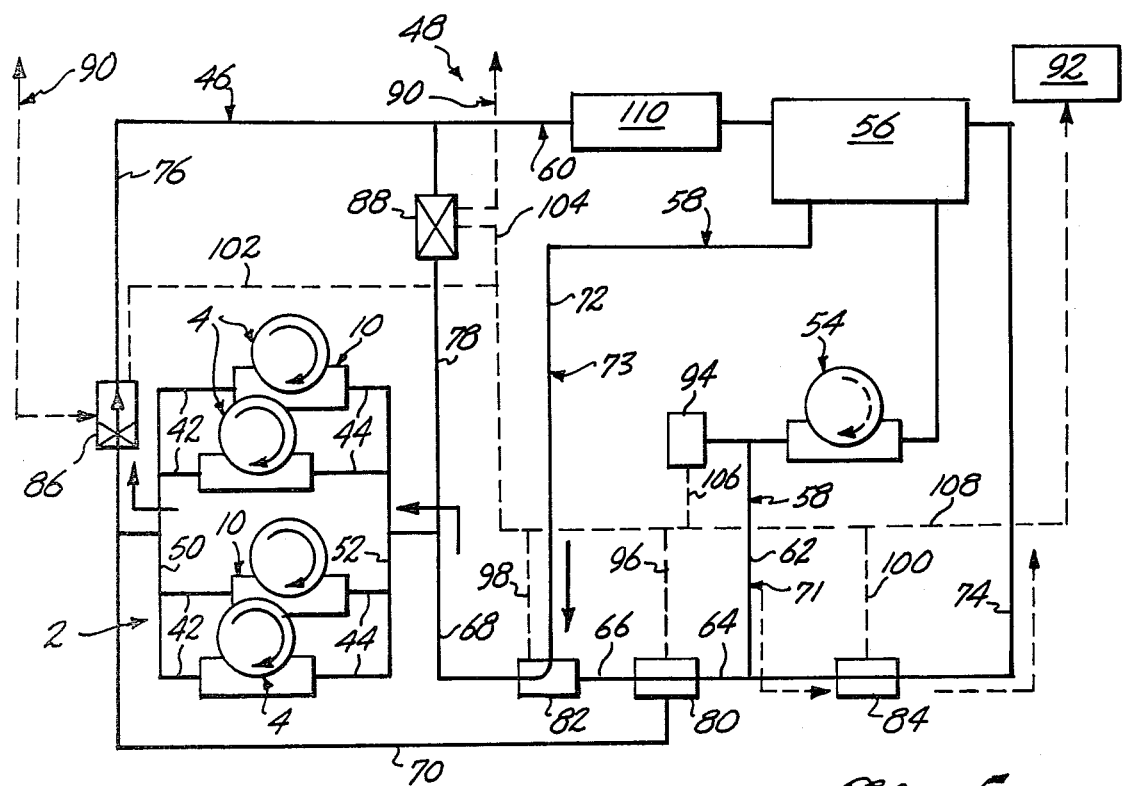
FIG. 5 is another such representation when the vehicle is being braked.

When the vehicle is at a standstill with the engine (not shown) of the pump 54 off, the control unit 92 programs the valves 80 through 88 to assume the positions of FIG. 3 wherein valves 84, and 86, 88 are seen to have their normally open and closed conditions, respectively, and the valves 80 and 82 are positioned in line 66 as shown. As a result, when the operator activates the engine to turn the pump, the pump output in line 62 of the positive feed connection 71 is bypassed to the reservoir through the valve 84, due to the fact that the valves 86 and 88 are closed. Should the operator decide to drive the vehicle forward, he then signals the control unit to close the valve 84 and simultaneously open the valve 86 in the return line 76. When this is done, the pump output is then positively fed through the motors and returned to the reservoir 56 through the connection 60. See FIG. 4. The rate of vehicle acceleration is determined in conventional manner by the engine throttle (not shown). Should the rate of acceleration be discontinued, or should the wheels of the vehicle assume the relatively faster speed for any other reason, such as a sharp drop in the engine input to the pump, the resulting pressure build up in the line 62, as monitored by the sensor 94, will cause the control unit to reopen the valve 84 at a predetermined pressure in the line. This in turn will bypass the pump output through the connection 74 once more. Furthermore, should the operator apply pressure to the brake pedal, this will also have the effect of reopening the valve 84 at the foregoing pressure in line 62, since the servomechanism 90 is responsive to the pedal to throttle the valve 86 in proportion to the applied pressure, and the throttling action will have the effect of throttling the rotors in turn. The throttling effect will again produce a condition in which the wheels tend to turn at a relatively faster speed and drive the rotors as pumps. In anticipation of this condition, however, in each of the above instances, the control unit also operates to alter the position of the valve 82 to connect the motors with the reservoir through the suction feed connection 73. See FIG. 5. In this condition the "motors" can continue to operate on a fluid-filled basis, and given ports 42 and 44 and tubing of appropriate size in the connections 71, 73 and 60, cavitation will not occur.

This condition continues, moreover, until the operator releases the brake pedal, whereupon the original operator-initiated signal shich closed the valve 84 and opened the valve 86 when the operator chose to drive the vehicle forward, once again causes the valve 86 to fully open and the valve 84 to close. It also returns the valve 82 to the position of FIG. 4. Assuming that the operator also increases the engine input to the pump, the rotors will again resume the relatively faster speed and resume driving the vehicle forward, the pressure in the line 62 meanwhile having fallen below the bypass pressure mentioned above. Similarly, each time the pressure in line 62 falls below the bypass pressure following one of the other rotor deceleration conditions mentioned above, the operator initiated signal recloses the valve 84 and returns the valve 82 to the position of FIG. 4, thus returning the mechanism to the drive condition of this Figure.

Figure 6:
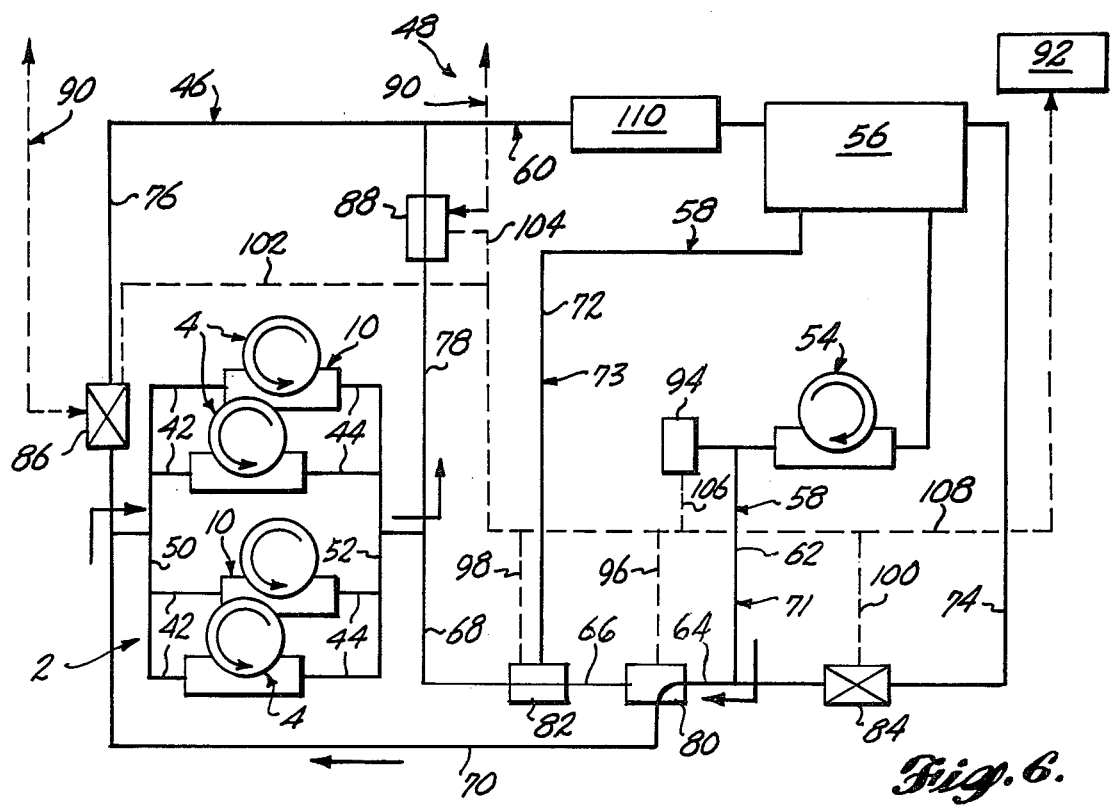
FIG. 6 is a fourth such representation when the vehicle is being driven in reverse.

Should the operator decide to back up the vehicle, that is, reverse the direction of the rotors, his signal to the control unit will cause the unit to open the valve 88 rather than the valve 86, to close the valve 84, and to position the valve 80 in the manner of FIG. 6. Once again, so long as the engine accelerates the pump and the vehicle experiences no sharp decrease in velocity, the valve 84 will remain closed and the valves 80 and 88 will remain in the positions described. Should either of these conditions change, however, or should the operator brake the vehicle, then the control unit will open the valve 84, and in this instance, alter the position of both the valve 80 and the valve 82. This will interconnect the suction feed connection 73 with the motors, while disconnecting the positive feed connection 71 from the same, thus enabling the fluid to flow through the "motors" under suction.

The control unit 92 can sense the standstill condition of the vehicle and/or the wheels to provide the signal whereby the circuit is programmed as in FIG. 3. Or the operator can initiate the signal through the control unit.

The heat generated in the circuit 46 when the motors are throttled under the foregoing conditions, is discharged through a heat exchanger 110 in the return connection 60.

The pump 54 can be powered directly by the engine, or through a simple gear-change box. Preferably, the engine is a rotary engine, such as a turbine engine.

The motors 10 are mounted on the four wheels as shown, in approximately the same space as that occupied by conventional braking systems. Pistons may be used in lieu of rotors.

Separate parking brakes (not shown) are commonly provided. Depending on the torque generated, they may also be used to supplement the present braking system under certain conditions, such as during back up of the vehicle.

What is claimed is:

1. In combination, a wheeled vehicle carriage and a combined drive and brake mechanism for the same comprising a hydraulic circuit having a power driven pump, a reservoir for hydraulic fluid, and a motor for each wheel or two or more coaxial wheels of the carriage, the motor having a movable driven member therein and ports for the infeed and outfeed of fluid therethrough, and there being connecting means between the pump, the reservoir and the ports whereby the fluid can be circulated through the motor to drive the driven member thereof, a connection between the driven member of the motor and the corresponding wheel or wheels whereby the motion of one is directly transmitted to the other and vice versa, depending on which is being driven at faster speed, means in the hydraulic circuit for varying the speed of the driven member, and means whereby the vehicle operator can control the speed varying means to adjust the rotational speed of the respective wheel or wheels of the carriage in relation to the speed of the vehicle, the connecting means including means whereby the hydraulic circuit can be programmed to assume (1) a mode of operation in which the pump output is fed to the motor to drive the driven member thereof at the relatively faster speed, or (2) a mode of operation in which the motor is connected to the reservoir in suction and the pump output is bypassed to the reservoir independent of the motor, and the control means including means whereby the vehicle operator can cause the circuit programming means to program the circuit to assume the first mentioned mode of operation, and means responsive to a predetermined pressure in the pump output to cause the circuit programming means to program the circuit to assume the second mentioned mode of operation.

2. The combination according to claim 1 wherein the speed varying means include valve means which are operable to vary the rate at which the fluid is circulated through the motor relative to the rotational speed of the corresponding wheel or wheels.

3. The combination according to claim 2 wherein the connecting means include a return connection between the motor outfeed port and the reservoir, and the valve means are disposed in the return connection.

4. The combination according to claim 3 wherein the valve means have a throttling capability and the control means include a servomechanism whereby the operator can throttle the valve means to vary the rate at which the fluid is discharged through the outfeed port of the motor.

5. The combination according to claim 1 wherein the control means also include means operable to cause the circuit programming means to program the circuit to assume the second mentioned mode of operation when the wheel or wheels are at a standstill.

6. The combination according to claim 1 wherein the circuit programming means include a positive feed connection between the reservoir and the motor infeed port through the pump, a suction feed connection between the reservoir and the motor infeed port, a bypass connection between the positive feed connection and the reservoir, and valve means in the respective connections whereby (1) the bypass connection can be closed and the pump output can be fed to the motor infeed port through the positive feed connection, or (2) the bypass connection can be opened and the motor infeed port can be connected to the reservoir through the suction feed connection; and wherein the control means include servocontrol means whereby the operator can signal the valve means to assume the first mentioned mode of operation, means for sensing the pressure in the positive feed connection, and second servocontrol means interconnected with the pressure sensing means and responsive to the predetermined pressure in the positive feed connection to override the operator initiated signal in the first mentioned servocontrol means to cause the valve means to assume the second mentioned mode of operation.

7. The combination according to claim 6 wherein the control means also include third servocontrol means which are responsive to the wheel or wheels being at a standstill to cause the second valve means to assume the second mentioned mode of operation.

8. The combination according to claim 7 wherein the driven member of the motor is capable of moving in forward and reverse directions, and the mechanism further comprises means for circulating the fluid through the motor in either the forward or reverse direction when the circuit is programmed to assume the respective first and second mentioned modes of operation.

9. The combination according to claim 8 wherein the connecting means include a return connection between the motor outfeed port and the reservoir, and each of the aforementioned feed connections and the return connection is bifurcated to be interconnected with alternative pairs of ports in the motor, the circuit programming means also include second valve means whereby each of the respective feed connections can be interconnected with the respective pairs of ports through alternative bifurcations, and the control means include fourth servocontrol means whereby the operator can signal the second valve means to interconnect the respective feed connections through the respective bifurcations corresponding to the respective forward and reverse directions during the respective modes of operation.

10. The combination according to claim 9 wherein the speed varying means include third valve means which are disposed in the return connection to vary the rate at which the fluid is circulated through the motor relative to the rotational speed of the corresponding wheel or wheels; and wherein the third valve means include shutoff valves in the bifurcations of the return connection, and the first mentioned valve means include a shutoff valve in the bypass connection, and two-way valves in the respective feed connections upstream of the respective bifurcations therein, there being a crossconnection between the two-way valves in the respective feed connections whereby they can also serve as the second valve means; and wherein the respective valves are electrically operated and the respective first, second, third and fourth mentioned servocontrol means take the form of an integrated control unit which is electrically interconnected with the pressure sensing means and the respective shutoff valves and two-way valves (1) to close the shutoff valves in the return connection, open the shutoff valve in the bypass connection, and position the two-way valves to open the positive feed connection to the bifurcation corresponding to the desired direction of movement when the wheel or wheels are at a standstill (2) to close the shutoff valve in the bypass connection and open the shutoff valve in the bifurcation of the return connection corresponding to the desired direction of movement when the operator initiates the signal to drive the driven member at the relatively faster speed, and (3) to open the shutoff valve in the bypass connection and adjust the position of one or more of the two-way valves in the feed connections to interconnect the motor with the reservoir through the appropriate bifurcation of the suction feed connection when the predetermined pressure is attained in the positive feed connection.

11. The combination according to claim 1 wherein the driven member of the motor is a rotary member.

12. The combination according to claim 11 wherein the rotary member is the symmetrically angularly grooved, vane-equipped rotor of a sliding vane type of hydraulic motor.

13. The combination according to claim 11 wherein the rotary member is mounted on the wheel or wheels to rotate about the rotational axis thereof.

14. The combination according to claim 11 wherein the wheel or wheels have a central hub and the rotary member is mounted on the same to be journalled about the axle or axles of the wheels.

15. In combination, a mechanism for driving and braking the wheeled carriage of a vehicle, including a hydraulic circuit having a power-driven pump, a reservoir for hydraulic fluid, and a motor having a driven member therein which is adapted for connection to a wheel or two or more coaxial wheels of the carriage so that the motion of one can be directly transmitted to the other and vice versa, depending on which is being driven at faster speed, there being connecting means between the pump, the reservoir, and the motor whereby the fluid can be circulated through the motor to drive the driven member, including means whereby the hydraulic circuit can be programmed to assume (1) a mode of operation in which the pump output is fed to the motor to drive the driven member at the relatively faster speed, or (2) a mode of operation in which the motor is connected to the reservoir in suction and the pump output is bypassed to the reservoir independent of the motor, means in the hydraulic circuit for varying the speed of the driven member, and means whereby the vehicle operator can control the speed varying means to adjust the rotational speed of the respective wheel or wheels of the carriage in relation to the speed of the vehicle including means whereby the vehicle operator can cause the circuit programming means to program the circuit to assume the first mentioned mode of operation, and means responsive to a predetermined pressure in the pump output to cause the circuit programming means to program the circuit to assume the second mentioned mode of operation.

* * * * *